United States Patent

[11] 3,616,275

| [72] | Inventors | Alfred Schneider<br>Morristown;<br>Arnold Leslie Ayers, Convent Station, both of N.J. |
|---|---|---|
| [21] | Appl. No. | 815,713 |
| [22] | Filed | Apr. 14, 1969 |
| [45] | Patented | Oct. 26, 1971 |
| [73] | Assignee | Allied Chemical Corporation<br>New York, N.Y. |

[54] PROCESS FOR CONCENTRATING A METAL OF VARIABLE VALENCE IN AQUEOUS SOLUTION
7 Claims, 1 Drawing Fig.

[52] U.S. Cl. .................................................. 204/1.5,
23/341, 23/344, 23/346, 204/86, 204/91
[51] Int. Cl. ...................................................... B01k 3/00
[50] Field of Search ............................................. 204/86, 91,
130, 131, 136, 1.5; 23/339, 340, 341, 343, 344, 346

[56] References Cited
UNITED STATES PATENTS

| 3,276,850 | 10/1966 | Rainey | 23/341 |
|---|---|---|---|
| 3,361,651 | 1/1968 | Parkinson et al. | 204/1.5 |
| 3,387,945 | 6/1968 | Boudry et al. | 23/341 |

*Primary Examiner*—Reuben Epstein
*Attorneys*—Ernest A. Polin and Birgit E. Morris

ABSTRACT: Method for concentrating a metal of variable valence in aqueous solution by extracting the metal with an immiscible organic solvent, separating the resulting immiscible solutions, forming a dispersion by agitating the organic solution with an immiscible aqueous solution which is a preferential solvent for the metal in a different valence state, passing an electric current through the dispersion in the cathode zone of an electrolytic cell (if a lower valence state is desired) or in the anode zone (if a higher valence state is desired), the cathode and anode zones being separated by a porous membrane, thereby effecting a valence change in the metal and a transfer to the aqueous solution, separating the immiscible solutions and recycling the aqueous solution for forming a dispersion with fresh organic solution.

PATENTED OCT 26 1971 3,616,275
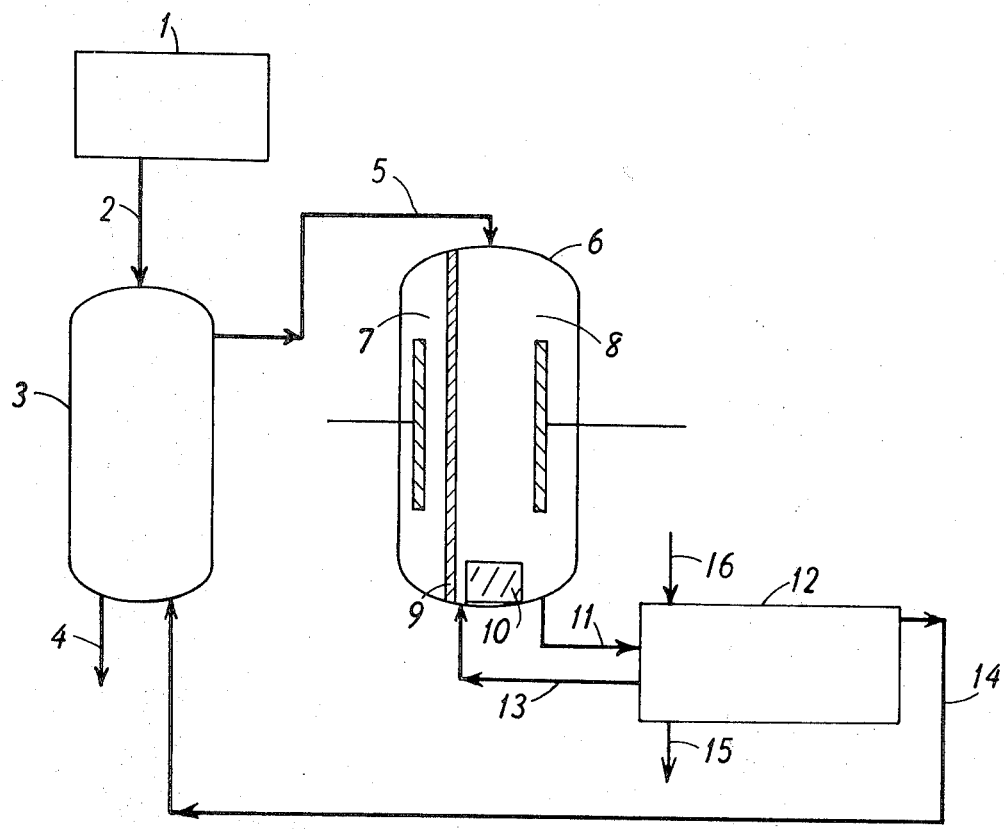
INVENTORS
ARNOLD L. AYERS
ALFRED SCHNEIDER
BY
*Birgit E. Morris*
ATTORNEY

PROCESS FOR CONCENTRATING A METAL OF VARIABLE VALENCE IN AQUEOUS SOLUTION

This invention relates to the concentration of aqueous solutions of metals of variable valence. More particularly, this invention relates to a method of concentrating a metal of variable valence in aqueous solution by electrochemical means.

BACKGROUND OF THE INVENTION

Evaporation of the solvent is the usual method of concentrating dilute aqueous solutions of one or more metals. In the case of metals obtained from nuclear fuels, plutonium in particular, this method is disadvantageous because plutonium may be lost due to polymerization and subsequent precipitation. Alternatively, the plutonium can be concentrated by forming a precipitate, as with NaOH or oxalic acid, and then dissolving the precipitate. However, the apparatus required for these steps is complex and this process is therefore costly.

SUMMARY OF THE INVENTION

It is an object of the present invention to provide a process for concentrating aqueous solutions of metals of variable valence without the necessity of evaporating the solvent.

It is another object to provide an improved method for concentrating aqueous plutonium solutions.

It is a further object to provide an improved method of purifying and concentrating plutonium solutions.

Further objects will become apparent in the following detailed description thereof.

It has been found that dilute aqueous solutions of metals of variable valence can be concentrated without the necessity of evaporating the solvent or precipitating the metal by contacting an aqueous solution of the metal with an immiscible organic liquid which is a preferential solvent for the metal in its existing valence state to extract the metal; separating the resulting organic solution from the aqueous solution; forming a dispersion by agitating the organic solution with an immiscible aqueous solution which is a preferential solvent for the metal in a higher or lower valence state; passing an electric current through the dispersion in the cathode zone of an electrolytic cell (if a lower valence state is desired) or in the anode zone of the cell (if a higher valence state is desired), the cathode and anode zones being separated by a porous membrane; separating the aqueous solution and the organic solution; and recycling the aqueous solution for forming a dispersion with a fresh batch of organic solution. These steps are repeated until the desired concentration of the metal in the aqueous solution is obtained. The organic solution obtained from the cell can be recycled to extract a fresh batch of the aqueous feed stream.

BRIEF DESCRIPTION OF THE DRAWING

The FIGURE is a flow diagram illustrating the present process.

DESCRIPTION OF THE PREFERRED EMBODIMENTS

The present process is particularly useful to concentrate aqueous plutonium solutions but broadly is applicable to concentrate an aqueous solution of a metal of variable valence which can be extracted first with an immiscible organic liquid and then reextracted with an aqueous solution when the metal is in a different valence state. The process is also applicable to purify aqueous metal solutions wherein the metal to be concentrated is selectively extracted by the organic solvent or when the final aqueous solution is a preferential solvent for one metal and not another. For example, both plutonium and uranium can be extracted by certain organic solvents, but trivalent plutonium is more soluble in aqueous solutions than is uranium; thus, plutonium can be separated from the uranium according to the present process wherein the plutonium will transfer to the aqueous solution after electrochemical treatment whereas most of the uranium will remain in the organic solvent. Other examples will be apparent to one skilled in the art. According to the present invention, aqueous metal solutions can be concentrated up to levels of about 150 to 250 gm./l. of metal. The process is adaptable to batch-type or semicontinuous operation.

Referring now to the FIGURE, the aqueous metal solution to be concentrated is drawn from reservoir 1 through line 2 to an extractor 3 which contains an organic liquid which is immiscible with the aqueous solution and is a preferential solvent for the metal in its existing valence state. The organic solvent comprises from 5 to 100 percent by weight of an alkyl phosphate which can also contain a hydrocarbon diluent. The alkyl phosphate can be mono-, di-, or triesters of phosphoric acid derived from alkanols having one to about eight carbon atoms such as butanol, hexanol, octanol and the like. Tributyl phosphate in an amount of from about 20 to 40 percent by weight in an organic diluent is generally employed as solvent for metals found in nuclear fuels; i.e.; uranium, plutonium and neptunium, due to its high extraction selectivity. Suitable diluents can be hydrocarbons such as dodecane, kerosene, gasoline and the like. Ketones such as hexone or amines such as dioctylamine can also be employed as the organic solvent.

The two immiscible solutions can be stirred together or contacted in a concurrent or countercurrent extractor or series of extractors as will be known to one skilled in the art. After separation of the resulting immiscible aqueous and organic solutions, the aqueous solution is drawn off through line 4.

The organic solution containing the extracted metal is drawn off through line 5 and charged to the anode or cathode zone of an electrolytic cell 6 partially filled with an electrolyte comprising an aqueous solution which is immiscible with the organic solution and is a preferential solvent for the metal in a lower or higher valence state. The exact size, shape, etc., of cell 6 can be varied, is conventional and does not constitute part of the invention. The cell 6 is divided into an anode zone 7 and a cathode zone 8 by a porous membrane 9. When the metal in the organic solution is to be reduced, the organic solution is charged to the cathode zone, as shown. When the metal in the organic solution is to be oxidized, the position of the anode and cathode zones is reversed. The cathode zone 8 is also fitted with a means of agitating the immiscible solutions, shown as stirrer 10, so as to form a dispersion. As indicated above, the electrolyte in the cell must be immiscible with the organic solution and be a preferential solvent for the metal in the organic solution in a different valence state. Suitable aqueous solutions include solutions of acids or salts, such as nitric acid or sodium nitrate. Aqueous nitric acid solutions are preferred. A small amount of a stabilizer such as hydrazine can be added to the electrolyte in an amount that will prevent reoxidation of the reduced metals. The anode zone 7 can contain the same or a different aqueous solution.

The electrolyte must be maintained as the continuous phase during the process.

After electrochemical treatment, the dispersion is drawn off through line 11 to a settler 12 wherein the immiscible organic and aqueous solutions are allowed to separate. The aqueous solution containing the reduced metal is recycled to the electrolytic cell 6 through line 13 for contact with a fresh batch of the organic solution. Recycling of the aqueous solution is repeated until the desired concentration of the metal in the solution is obtained. The organic solution in the settler 12 is drawn off and can be recycled to the extractor 3 through line 14.

When the desired concentration of metal in the aqueous solution has been achieved, the product stream is withdrawn from the settler 12 through line 15. A fresh batch of aqueous solution is added through line 16 to replace the concentrated aqueous solution withdrawn.

The electrochemical reduction step is described in greater detail in our copending application Ser. No. 815,714, "Electrochemical Reduction or Oxidation," filed concurrently herewith.

This invention will be further illustrated by the examples given below. The reactions in the examples is followed by spectrophotometric and radiochemical analyses to determine the valence state of the metals. Standard curves were established for hexavalent uranium at 410 millimicrons, for tetravalent uranium at 645 millimicrons, for trivalent plutonium at 560 and 605 millimicrons, for tetravalent plutonium at 476 millimicrons, for hexavalent plutonium at 831 millimicrons, for tetravalent neptunium at 715 millimicrons and for pentavalent neptunium at 617 millimicrons.

EXAMPLE 1

An aqueous solution containing 0.15 M of uranyl nitrate and 3.0 M of nitric acid is fed to a batch solvent extractor containing an equal volume of 30 percent by volume tributyl phosphate in dodecane. After extraction, the resulting immiscible aqueous and organic layers are separated. The organic phase, containing 90 percent of the uranium, is transferred to the cathode zone of an electrolytic cell containing an equal volume of an aqueous solution containing 0.5 M of nitric acid and 0.2 M of hydrazine. The anode zone contains an aqueous solution of 0.5 M nitric acid. The anode zone and the cathode zone are separated by a porous cationic exchange membrane. The electrodes are made of platinum. A stirrer in the cathode zone is turned on to form a dispersion of the two immiscible solutions, and a current of 0.13 cm.$^2$ is passed through the cell. After about 1 hour, the uranium is reduced to the tetravalent state and transfers to the aqueous phase. The dispersion is drawn off to a settling vessel and the phases are allowed to separate. The aqueous solution is recycled to the cell for contacting with a fresh organic solution. The organic phase is drawn off, treated with a 5 percent sodium nitrite solution to oxidize any remaining tetravalent uranium and is contacted with a fresh batch of the aqueous feed stream in the extractor. The cycles are repeated. After seven cycles, the uranium concentration in the aqueous solution from the cell is 0.51 M, or a 3.4 times concentration over the feed stream.

EXAMPLE 2

The procedure of example 1 is followed except utilizing as feed stream a plutonium nitrate solution containing 0.5 g./l. of tetravalent plutonium. After seven cycles, the plutonium concentration in the aqueous solution is 3.1 g./l. of trivalent plutonium, corresponding to a 6.2 times concentration over the feed stream.

EXAMPLE 3

The procedure of example 1 is followed except utilizing as feed stream a neptunium nitrate solution containing 0.5 g./l. of tetravalent neptunium, and the organic extract is charged to the anode zone of the cell. After seven cycles, the neptunium concentration is 2.5 g./l. of pentavalent neptunium, corresponding to a 5 times concentration over the feed stream.

We claim:

1. A process for concentrating a metal of variable valence state in aqueous solution which comprises:
   a. contacting an aqueous solution of the metal with an immiscible organic liquid which is a preferential solvent for the metal in its existing valence state, whereby the metal transfers from the aqueous solution to the organic liquid;
   b. separating the resulting immiscible organic and aqueous solutions;
   c. forming a dispersion by agitating the organic solution from step (b) with, as electrolyte, an immiscible aqueous solution which is a preferential solvent for the metal in a higher or lower valence state;
   d. passing an electric current through the dispersion in the cathode zone of an electrolytic cell (if a lower valence state is desired) or in the anode zone of the cell (if a higher valence state is desired), while maintaining the electrolyte as the continuous phase, the cathode and anode zones being separated by a porous membrane, whereby the valence state of the metal becomes higher or lower and the metal transfers to the aqueous solution;
   e. separating the immiscible organic and aqueous solutions;
   f. recycling the aqueous solution for forming a dispersion with fresh organic solution in step (c), whereby the aqueous solution becomes enriched in the metal.

2. A process according to claim 1 wherein the organic solution contains from 5 to 100 percent by weight of an alkyl phosphate which optionally contains a hydrocarbon diluent.

3. A process according to claim 2 wherein the metal is plutonium and the aqueous solution is an aqueous nitric acid solution.

4. A process according to claim 2 wherein the metal is uranium and the aqueous solution is an aqueous nitric acid solution.

5. A process according to claim 3 wherein the aqueous solution additionally contains hydrazine.

6. A process according to claim 1 wherein the organic solution separated in step (e) is recycled to step (a).

7. A process according to claim 1 wherein the organic solution contains from 20 to 40 percent of tributyl phosphate in a hydrocarbon diluent, wherein the metal is plutonium and the aqueous solution is dilute nitric acid containing hydrazine.

* * * * *